United States Patent [19]
Agano

[11] Patent Number: 5,638,109
[45] Date of Patent: Jun. 10, 1997

[54] METHOD OF RECORDING IMAGE WITH LASER BEAM

[75] Inventor: Toshitaka Agano, Kanagawa-ken, Japan

[73] Assignee: Fuji Photo Film Co., Ltd., Kanagawa, Japan

[21] Appl. No.: 304,696

[22] Filed: Sep. 12, 1994

[30] Foreign Application Priority Data

Sep. 14, 1993 [JP] Japan .................................. 5-229107

[51] Int. Cl.$^6$ ...................................................... B41J 2/47
[52] U.S. Cl. ............................................ 347/251; 347/118
[58] Field of Search ............................... 347/118, 131, 347/251, 252, 253, 254, 240, 115; 358/298, 300, 302

[56] References Cited

U.S. PATENT DOCUMENTS 5,097,463  3/1992  Wagenblast et al. ............... 369/110
5,438,437  8/1995  Mizoguchi et al. ................. 347/118

FOREIGN PATENT DOCUMENTS 62-78964   4/1987  Japan ................. H04N 1/04
64-2076    1/1989  Japan ................. B41J 3/20
5-24219    2/1993  Japan ................. B41J 2/32
5-301447  11/1993  Japan ................. B41M 5/26

Primary Examiner—Mark J. Reinhart
Attorney, Agent, or Firm—Sughrue, Mion, Zinn, Macpeak & Seas

[57] ABSTRACT

Corrected recording data for a present pixel are generated from recording data stored in an image memory based on recording data for pixels preceding, following, above, and beneath the present pixel, and stored in a corrected image memory. A laser diode is energized according to the corrected recording data to output a laser beam for thereby recording an image on a thermosensitive recording medium. Since the recording data have been corrected taking into account the thermal energy from the adjacent pixels, the image thus recorded on the thermosensitive recording medium is highly accurate at a high speed.

5 Claims, 3 Drawing Sheets

METHOD OF RECORDING IMAGE WITH LASER BEAM

BACKGROUND OF THE INVENTION

1. Field of the Invention

The present invention relates to a method of recording an image or other information on a thermosensitive recording medium by applying thermal energy to the thermosensitive recording medium with a laser beam.

2. Description of the Related Art

Thermal recording apparatus for applying thermal energy to a thermosensitive recording medium to record an image or other information thereon are in widespread use. For example, a thermal printer having a thermal head composed of a linear array of heating resistive elements is widely used.

In the thermal printer, the heating resistive elements are successively heated depending on the image information to be recorded, thus forming an image as a cluster of pixels. The thermal energy produced by the heating resistive element which is presently being heated is transmitted to a support on which the thermal head is supported. The thermal energy transmitted to the thermal head support adversely affects the formation of a pixel by a succeeding heating resistive element. As a result, the thermal head fails to form an image having a desired density distribution.

Japanese patent publication No. 64-2076 discloses a thermal recording apparatus which is designed to solve the above problem. In the disclosed thermal recording apparatus, the number of pulses to be applied to a heating resistive element that is to be heated presently is controlled in view of the heat information as to those pixels positioned before, above, below, and after the pixel produced by the heating resistive element that is to be heated presently. In this manner, any undue temperature rise of the thermal head support is compensated for to print a high-quality image free of blurs.

Another known thermal recording apparatus is a laser beam recording apparatus which uses a laser beam as a heat source for recording an image at a high speed, as disclosed in Japanese laid-open patent publication No. 62-78964. The laser beam recording apparatus scans a thermosensitive recording medium with an intensity-modulated laser beam in a main scanning direction while the thermosensitive recording medium is being fed in an auxiliary scanning direction, thereby recording an image or other information on the thermosensitive recording medium.

Since the laser beam recording apparatus does not have a plurality of heat sources, it is not necessary to take into consideration the effect of a temperature rise of the heat source as is the case with the thermal recording apparatus. However, the laser beam irradiating the thermosensitive recording medium has a Gaussian thermal energy distribution in its cross section, requiring efforts to be made to remove the effect of the Gaussian thermal energy distribution on those pixels which are positioned adjacent to the pixel that is formed by the laser beam. It is also necessary to take into account the effect of heat conduction on the thermosensitive recording medium.

SUMMARY OF THE INVENTION

It is therefore an object of the present invention to provide a method of recording information on a thermosensitive recording medium with a laser beam highly accurately at a high speed while eliminating the effect of heat from adjacent pixels.

According to the present invention, the above object can be achieved by a method of recording information on a thermosensitive recording medium, which can develop a color having a density depending on the thermal energy of a laser beam applied thereto, wherein a laser beam which has been intensity-modulated by recording data is applied to the thermosensitive recording medium to form successive pixels thereon in a main scanning direction, and the thermosensitive recording medium is moved in an auxiliary scanning direction transverse to the main scanning direction, the method comprising steps of correcting recording data for a present pixel based on recording data for a pixel preceding the present pixel, recording data for a pixel following the present pixel, recording data for a pixel above the present pixel, and recording data for a pixel beneath the present pixel, and forming the present pixel based on the corrected recording data by applying the laser beam to the thermosensitive recording medium.

Since the recording data have been corrected taking into account the thermal energy from the adjacent pixels, the image thus recorded on the thermosensitive recording medium is highly accurate at a high speed.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A method of recording information on a thermosensitive recording medium with a laser beam according to the present invention will be described below as being carried out by a laser beam recording apparatus shown in FIG. 1.

Figure 1:
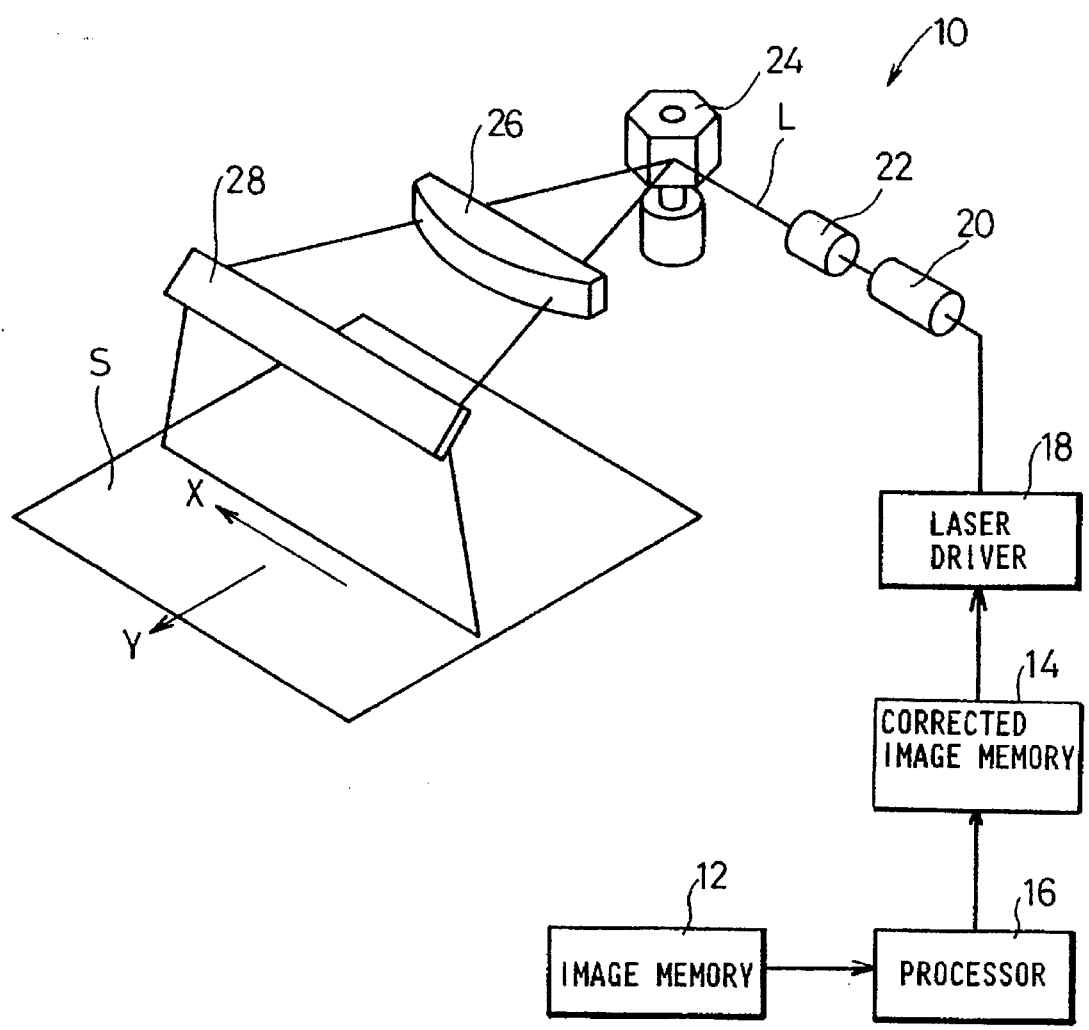
FIG. 1 is a schematic perspective view, partly in block form, of a laser beam recording apparatus which carries out a method of recording information on a thermosensitive recording medium with a laser beam according to the present invention.

As shown in FIG. 1, a laser beam recording apparatus 10 scans a thermosensitive recording medium S, which is being fed in an auxiliary scanning direction indicated by the arrow Y, with a laser beam L in a main scanning direction indicated by the arrow X for thereby recording an image or other information in multiple gradient steps on the thermosensitive recording medium S.

The thermosensitive recording medium S comprises a transparent support base and a thermosensitive layer disposed thereon. The thermosensitive layer comprises a combination of microcapsules containing a basic dye precursor which is a leuco dye and a color developer, and light-absorbing coloring matters for absorbing and converting the laser beam L into thermal energy. For details, see Japanese laid-open patent publications Nos. 5-301447 and 5-24219, for example.

The basic dye precursor produces a color by giving an electron or receiving a proton such as of acid or the like. The basic dye precursor comprises a compound which is usually substantially colorless and has a partial skeleton such as of lactone, lactam, sultone, spiropyrane, ester, amide, or the like, the partial skeleton being split or cleaved upon contact with the color developer.

The color developer used in combination with the leuco dye comprises a phenol compound, a sulfur-containing phenol compound, a carboxylic acid compound, a sulfone compound, a urea or thiourea compound, or the like.

The laser beam recording apparatus 10 comprises an image memory 12 for storing two-dimensional image data, a corrected image memory 14 for storing corrected image data representing the two-dimensional image data which have been corrected, a processor 16 for determining the corrected image data, and a laser driver 18 for generating a laser drive signal according to the corrected image data. The laser drive signal is supplied from the laser driver 18 to a laser diode 20 which emits the laser beam L. Between the laser diode 20 and the thermosensitive recording medium S, there are provided a collimator lens 22 for converting the laser beam L into a parallel beam, a polygonal mirror 24 for deflecting the laser beam L, an fθ lens 26, and a reflecting mirror 28 for guiding the laser beam L to the thermosensitive recording medium S.

Recording operation of the laser beam recording apparatus 10 will be described below.

Two-dimensional image data output from the image memory 12 are processed by the processor 16 into corrected image data based on which a high-quality image can be produced, and the corrected image data are stored in the corrected image memory 14. The corrected image data are then converted by the laser driver 18 into a laser drive signal, which is supplied to the laser diode 20. The laser diode 20 emits a laser beam L which has been intensity-modulated by the laser drive signal. The laser beam L is converted by the collimator lens 22 into a parallel laser beam L, which is reflected and deflected by the polygonal mirror 24 and applied to the thermosensitive recording medium S through the fθ lens 26 and the reflecting mirror 28 while at the same time scanning the thermosensitive recording medium S in the main scanning direction X. Since the thermosensitive recording medium S is fed in the auxiliary scanning direction Y, a two-dimensional image is formed on the thermosensitive recording medium S when the thermosensitive recording medium S is heated in the main scanning direction X by the laser beam L.

Figure 2:
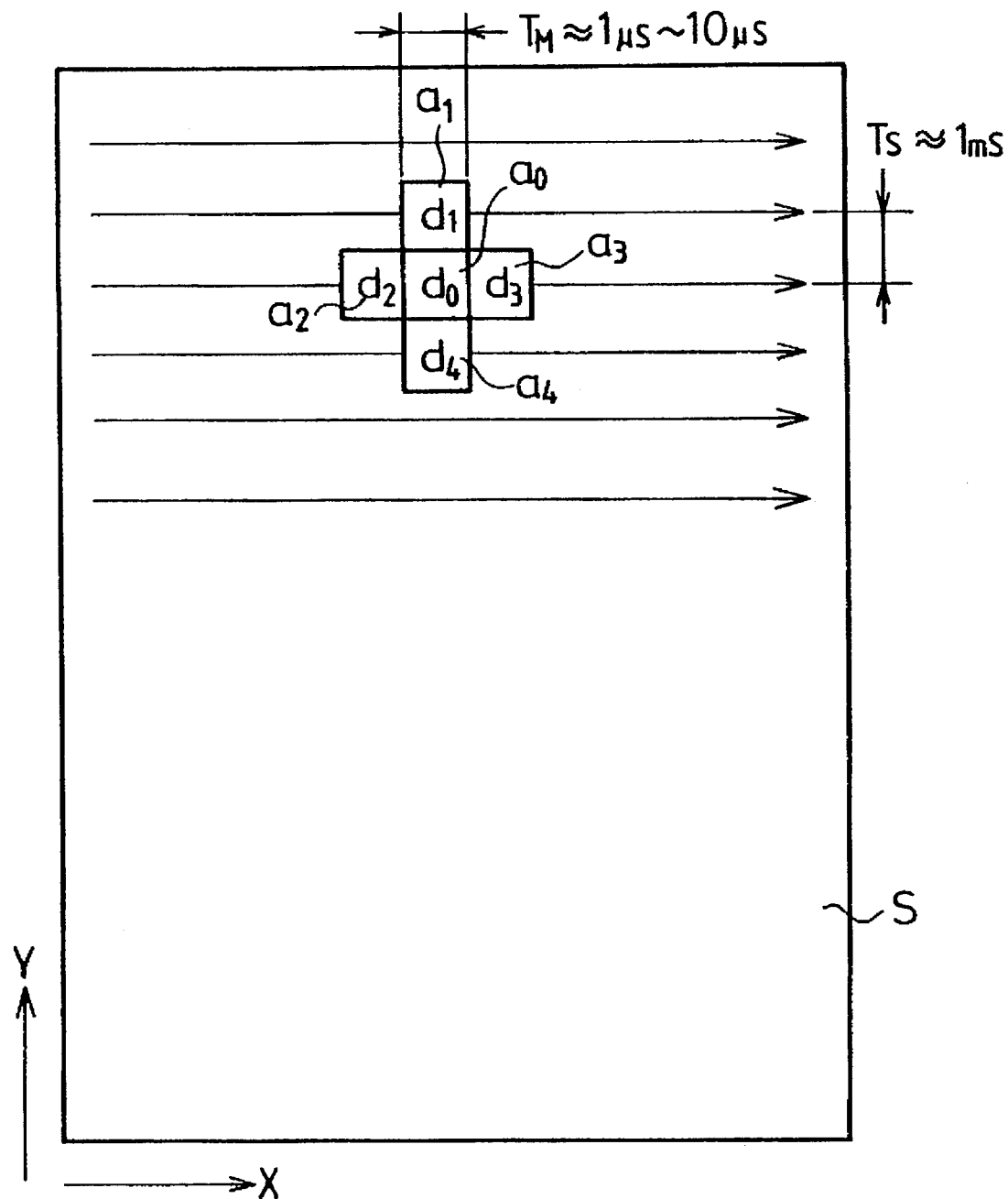
FIG. 2 is a diagram showing the relationship of pixels required for correction on the thermosensitive recording medium.

A process of forming a pixel having a desired density in any optional recording position $a_0$ on the thermosensitive recording medium S, as shown in FIG. 2, will be described below. It is assumed that uncorrected recording data or image data to form a pixel in the recording position $a_0$ are represented by $d_0$, and uncorrected recording data or image data to form pixels respectively in a recording position $a_2$ positioned upstream of and adjacent to the recording position $a_0$ in the main scanning direction X, a recording position $a_3$ positioned downstream of and adjacent to the recording position $a_0$ in the main scanning direction X, a recording position $a_1$ positioned upstream of and adjacent to the recording position $a_0$ in the auxiliary scanning direction Y, and a recording position $a_4$ positioned downstream of and adjacent to the recording position $a_0$ in the auxiliary scanning direction Y are represented respectively by $d_2$, $d_3$, $d_1$, $d_4$.

Figure 3:
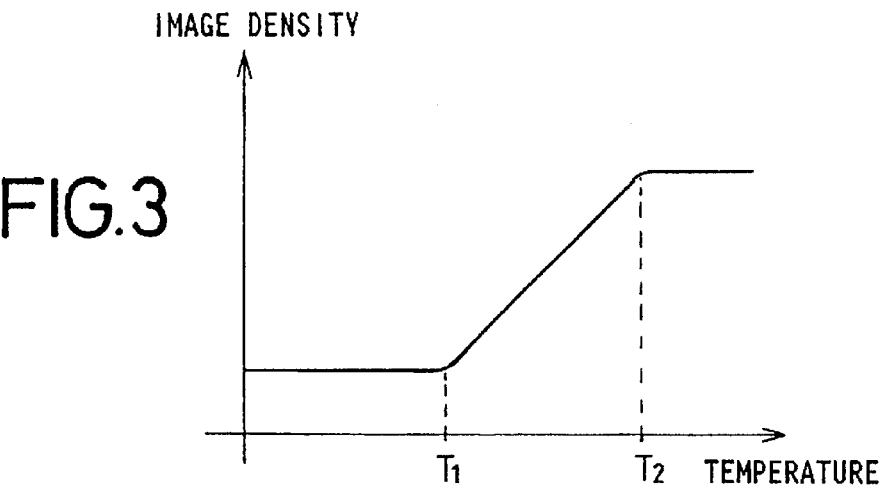
FIG. 3 is a diagram showing coloring characteristics of the thermosensitive recording medium.
Figure 4:
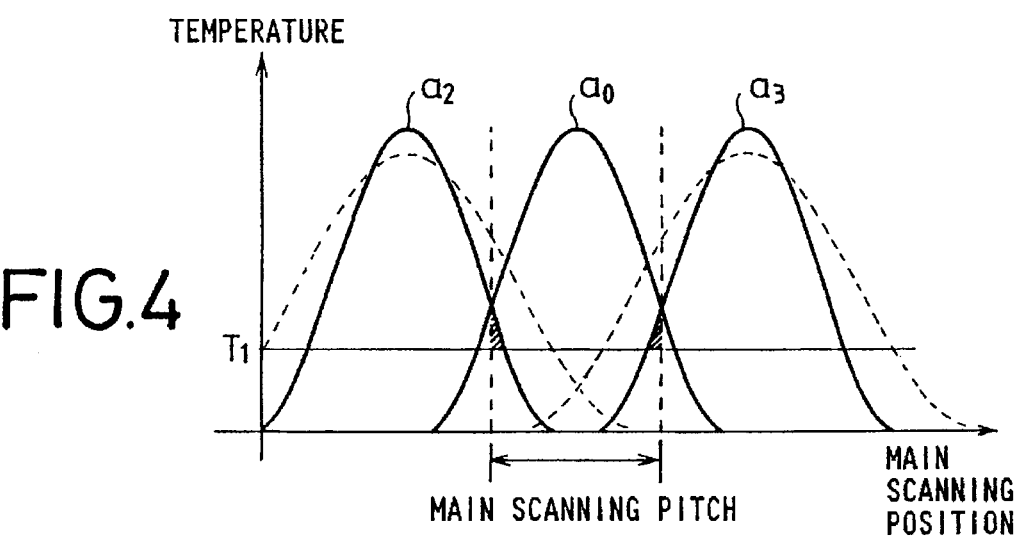
FIG. 4 is a diagram showing the temperatures of pixels heated by thermal energy applied in a main scanning direction of the thermosensitive recording medium.

As shown in FIG. 3, the thermosensitive recording medium S is caused to develop its color when it is heated by the thermal energy applied by the laser beam L to a temperature range of from a temperature $T_1$ to a temperature $T_2$. Since the energy distribution in a cross section of the laser beam L is a Gaussian distribution, the recording data $d_2$, $d_0$, $d_3$ to form pixels in the respective recording positions $a_2$, $a_0$, $a_3$ arrayed in the main scanning direction X produce temperature distributions as shown in FIG. 4. Portions (shown hatched) of the laser beam L applied to the recording positions $a_2$, $a_3$ are also applied to the recording position $a_0$ within a main scanning pitch. The thermal energy applied to the recording positions $a_2$, $a_3$ is gradually transferred to the recording position $a_0$ through the thermosensitive recording medium S as indicated by the broken lines. The recording time $T_M$ per pixel in the main scanning direction X, i.e., a period of time required to record a pixel with the laser beam L in the main scanning direction X, is in the range of from 1 μs to 10 μs, as shown in FIG. 2. Therefore, the recording position $a_0$ is substantially simultaneously given the thermal energy from the recording positions $a_2$, $a_3$ as well as the thermal energy which is intended to be applied to the recording position $a_0$. As a result, the actual density of the recording position $a_0$ becomes greater than a desired density. The recording position $a_2$ which is positioned upstream from the recording position $a_0$ in the main scanning direction X has a greater effect on the image density in the recording position $a_0$ than the recording position $a_3$.

Figure 5:
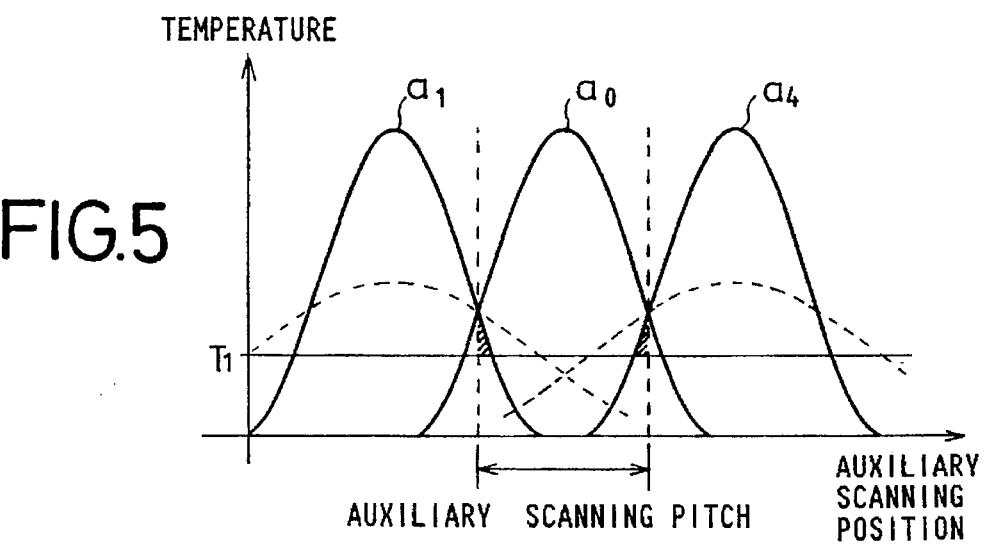
FIG. 5 is a diagram showing the temperatures of pixels heated by thermal energy applied in an auxiliary scanning direction of the thermosensitive recording medium.

The recording data $d_1$, $d_0$, $d_4$ to form pixels in the respective recording positions $a_1$, $a_0$, $a_4$ arrayed in the auxiliary scanning direction Y produce temperature distributions as shown in FIG. 5. Portions (shown hatched) of the laser beam L applied to the recording positions $a_1$, $a_4$ are also applied to the recording position $a_0$ within an auxiliary scanning pitch. The thermal energy applied to the recording positions $a_1$, $a_4$ is gradually transferred to the recording position $a_0$ through the thermosensitive recording medium S as indicated by the broken lines. The recording time $T_S$ per pixel in the auxiliary scanning direction Y, i.e., a period of time required to record a pixel with the laser beam L in the auxiliary scanning direction Y, is of about 1 ms which is longer than the recording time $T_M$ per pixel in the main scanning direction X. While the thermal energy applied to the recording positions $a_1$, $a_4$ has a smaller effect on the recording position $a_0$ than that applied to the recording positions $a_2$, $a_3$, the actual density of the recording position $a_0$ becomes greater than a desired density. The recording position $a_1$ which is positioned upstream from the recording position $a_0$ in the auxiliary scanning direction Y has a greater effect on the image density in the recording position $a_0$ than the recording position $a_4$.

Based on the above analysis, an image pixel of a desired density can be formed in the recording position $a_0$ by setting the recording data D to be supplied to the recording position $a_0$ to:

$$D = d_0 - k_1 \cdot d_2 - k_2 \cdot d_3 - k_3 \cdot d_1 - k_4 \cdot d_4 \quad (1)$$

where $k_1$, $k_2$, $k_3$, $k_4$ are coefficients satisfying the relationship: $k_4 < k_3 < k_2 < k_1$ and $0 < k_1 + k_2 + k_3 + k_4 \leq 1$.

Since the recording time $T_M$ per pixel in the main scanning direction X is short, the effects of the recording positions $a_2$, $a_3$ on the recording position $a_0$ can be regarded as being substantially equal to each other. Thus, an image or pixel of a desired density can be formed in the recording position $a_0$ by setting the recording data D to:

$$D = d_0 - k_1 \cdot (d_2 + d_3) - k_2 \cdot d_1 - k_3 \cdot d_4 \quad (2)$$

instead of the equation (1), where $k_1$, $k_2$, $k_3$ are coefficients satisfying the relationship: $k_3 < k_2 < k_1$ and $0 < 2k_1 + k_2 + k_3 \leq 1$.

If the effects of the recording positions $a_1$, $a_4$ on the recording position $a_0$ are regarded as being substantially equal to each other, then an image or pixel of a desired density can be formed in the recording position $a_0$ by setting the recording data D to:

$$D = d_0 - k_1 \cdot (d_2 + d_3) - k_2 \cdot (d_1 + d_4) \quad (3)$$

instead of the equation (2), where $k_1$, $k_2$ are coefficients satisfying the relationship: $k_2 < k_1$ and $0 < 2k_1 + 2k_2 \leq 1$.

Furthermore, if the effects of the recording positions $a_1$ through $a_4$ on the recording position $a_0$ are regarded as being substantially equal to each other, then an image or pixel of a desired density can be formed in the recording position $a_0$ by setting the recording data D to:

$$D = d_0 - k \cdot (d_2 + d_3 + d_1 + d_4) \quad (4)$$

instead of the equation (3), where k is a coefficient satisfying the relationship: $0 < 4k \leq 1$.

The recording or image data in the image memory 12 are converted into corrected recording or image data based on either one of the equations (1) through (4), and the corrected image data are stored in the corrected image memory 14. The laser diode 20 is energized according to the corrected image data read from the corrected image memory 14 to output a laser beam to record an image in a pixel on the thermosensitive recording medium S. The image thus formed in the pixel on the thermosensitive recording medium S is of a desired density which has been corrected by compensating for the effects of the thermal energy from the adjacent pixels.

Although a certain preferred embodiment of the present invention has been shown and described in detail, it should be understood that various changes and modifications may be made therein without departing from the scope of the appended claims.

What is claimed is:

1. A method of recording information on a thermosensitive recording medium, which develops a color having a density depending on the thermal energy of a laser beam applied thereto, wherein a laser beam, which has been intensity-modulated by corrected recording data, is applied to the thermosensitive recording medium to form successive pixels thereon in a main scanning direction, and wherein the thermosensitive recording medium is moved in an auxiliary direction, said method comprising the steps of:

correcting recording data for a present pixel based on recording data for a pixel preceding the present pixel, recording data for a pixel following the present pixel, recording data for a pixel above the present pixel, and recording data for a pixel beneath the present pixel; and forming the present pixel based on the corrected recording data by applying the intensity-modulated laser beam to the thermosensitive recording medium.

2. A method according to claim 1, wherein the recording data for the present pixel is corrected into corrected recording data D:

$$D = d_0 - k_1 \cdot d_2 - k_2 \cdot d_3 - k_3 \cdot d_1 - k_4 \cdot d_4$$

where $d_0$ represents the recording data for the present pixel, $d_2$ the recording data for the pixel preceding the present pixel, $d_3$ the recording data for the pixel following the present pixel, $d_1$ the recording data for the pixel above the present pixel, $d_4$ the recording data for the pixel beneath the present pixel, and $k_1$, $k_2$, $k_3$, $k_4$ are coefficients satisfying the relationship: $k_4 < k_3 < k_2 < k_1$ and $0 < k_1 + k_2 + k_3 + k_4 \leq 1$.

3. A method according to claim 1, wherein the recording data for the present pixel is corrected into corrected recording data D:

$$D = d_0 - k_1 \cdot (d_2 + d_3) - k_2 \cdot d_1 - k_3 \cdot d_4$$

where $d_0$ represents the recording data for the present pixel, $d_2$ the recording data for the pixel preceding the present pixel, $d_3$ the recording data for the pixel following the present pixel, $d_1$ the recording data for the pixel above the present pixel, $d_4$ the recording data for the pixel beneath the present pixel, and $k_1$, $k_2$, $k_3$ are coefficients satisfying the relationship: $k_3 < k_2 < k_1$ and $0 < 2k_1 + k_2 + k_3 \leq 1$.

4. A method according to claim 1, wherein the recording data for the present pixel is corrected into corrected recording data D:

$$D = d_0 - k_1 \cdot (d_2 + d_3) - k_2 \cdot (d_1 + d_4)$$

where $d_0$ represents the recording data for the present pixel, $d_2$ the recording data for the pixel preceding the present pixel, $d_3$ the recording data for the pixel following the present pixel, $d_1$ the recording data for the pixel above the present pixel, $d_4$ the recording data for the pixel beneath the present pixel, and $k_1$, $k_2$ are coefficients satisfying the relationship: $k_2 < k_1$ and $0 < 2k_1 + 2k_2 \leq 1$.

5. A method according to claim 1, wherein the recording data for the present pixel is corrected into corrected recording data D:

$$D = d_0 - k \cdot (d_2 + d_3 + d_1 + d_4)$$

where $d_0$ represents the recording data for the present pixel, $d_2$ the recording data for the pixel preceding the present pixel, $d_3$ the recording data for the pixel following the present pixel, $d_1$ the recording data for the pixel above the present pixel, $d_4$ the recording data for the pixel beneath the present pixel, and k is a coefficient satisfying the relationship: $0 < 4k \leq 1$.

* * * * *